G. J. DICKSON.
LAMP WICK TRIMMER AND WIPER.
APPLICATION FILED FEB. 28, 1911.

1,018,745.

Patented Feb. 27, 1912.

WITNESSES:

INVENTOR.
Gilbert J. Dickson

UNITED STATES PATENT OFFICE.

GILBERT J. DICKSON, OF ALBANY, NEW YORK.

LAMP-WICK TRIMMER AND WIPER.

1,018,745.  Specification of Letters Patent.  Patented Feb. 27, 1912.

Application filed February 28, 1911. Serial No. 611,460.

*To all whom it may concern:*

Be it known that I, GILBERT J. DICKSON, a citizen of the United States, residing at Albany, in the county of Albany and State of New York, have invented a new and useful Lamp-Wick Trimmer and Wiper, of which the following is a specification.

My invention relates to round wick lamps having inner and outer wick tubes.

The object of my invention is chiefly to provide a cheap and efficient round wick trimmer and wiper on which a tempered steel blade or cutter may be used, the same being detachable for sharpening when dull, whereby the charred end of the wick may be smoothly and evenly sheared off against outer or inner wick tubes. I obtain these objects by the mechanism and devices, shown in the accompanying drawings and set forth in the following specification.

Figure 4:
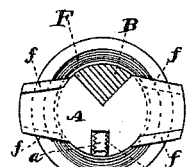
Figure 7:
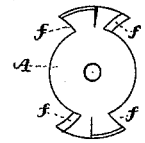
Figure 3:
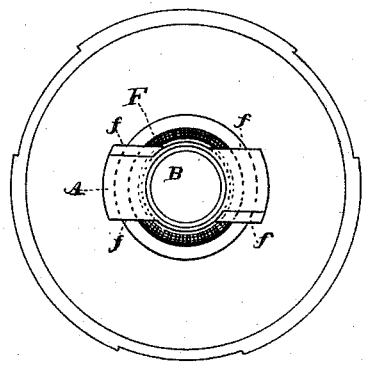
Figure 6:
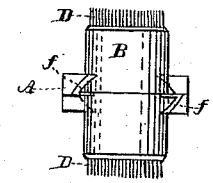
Figures 5, 9:
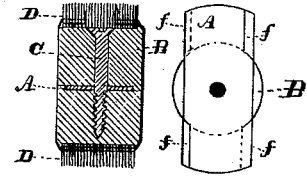
Figures 2, 8:
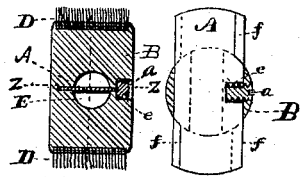
Figure 1:
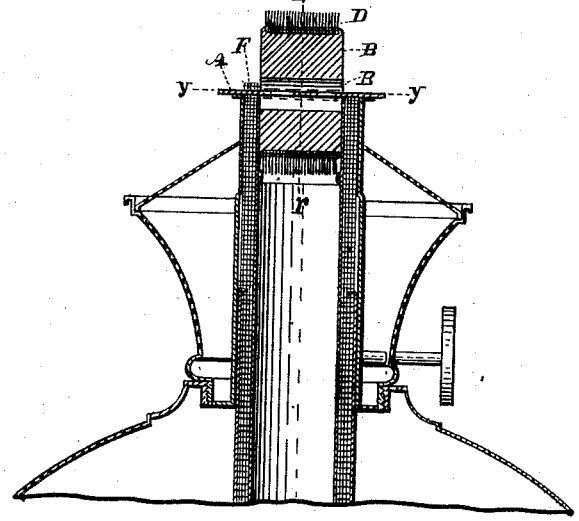

In the drawings: Figure 1, is a vertical section of my improved wick trimmer as used on the burner of an incandescent lamp with trimmer in position for operation thereon. Fig. 2, is a section of Fig. 1, on the line $r$, $r$. Fig. 3, is a top or end view of Fig. 1. Fig. 4, is a modification of Figs. 1, and 2, of my improved trimmer. Fig. 5, is a modified construction of Figs. 1, and 2.
Fig. 6, is the same construction as Fig. 5, showing the blade formed to trim a bevel wick. Fig. 7, is detached cutting blade of Fig. 6. Fig. 8 is a horizontal section of Fig. 2, taken on the line Z, Z. Fig. 9, is an end view of Fig. 5, with half of the hub and the fastening screw $c$, removed.

Similar letters of reference indicate corresponding parts throughout the several views.

My improved lamp wick trimmer, consists of the steel cutting blade, A, and the hub B on each side thereof, and the wiper D, on each end of the hub B, as shown in Figs. 1, 2, 3, 4, 5 and 6.

The cutting blade A, is preferably made of tempered steel, sufficiently thin to conform to the top of the wick tubes when pressed down so that the cutting edge $f$, of said blade moves close to the end of the wick tubes, as shown in Figs. 1, 2, and 4, and so eccentrically formed as shown in Figs. 3, and 4, that when the trimmer is rotated the blade's cutting edge has a shearing movement cutting the wick against the inner surface of the outer wick tubes.

The hub B, is preferably made of wood, and may be in halves and secured on each side of the blade A, by the screw $c$, as shown in Fig. 5, or the said hub may be in one piece, and the blade A, passed through the slotted opening E, formed therein, and fastened by the set screw $a$, entering the notch $e$, of the blade, as shown in Figs. 2, 4, and 8. The hub B, is provided with the wiper D, made of plush cloth or other suitable material and glued in a countersink in the end of said hub as shown in Figs. 1, 2, and 5.

As before mentioned the blade A, is detachable from the hub for sharpening, by loosening the set screw $a$, as shown in Figs. 2, 4, and 8, or by removing the screw $c$, as shown in Figs. 5, and 9, the blade may be removed, said blade having cutting edges on both sides is reversible and may be made to trim two different sized lamps by making the hub ends of suitable size, to fit the inner diameter of the inner wick tube of each different sized lamp.

When the trimmer is intended for bevel wicks, the blade may be made in the form shown in Figs. 6, and 7. When the wick will be in that case sheared off against the outer surface of the inner wick tube, and the hub fastened thereto and shown in Fig. 5.

The difficulty of trimming a round kerosene oil lamp wick, even and smooth so as to produce a uniform flame all around by hand or any trimmer now on the market, is well understood by all familiar with such lamps,—making comment here unnecessary.

I am aware that prior to my invention, that rotary wick trimmers with scrapers for removing the carbon from the wick have been used. I do not therefore claim such a combination broadly, but What I do claim and desire to secure by Letters Patent is:

1. In a round lamp wick trimmer, the combination with a hub adapted to be inserted in a round wick tube, having a wiper attached thereto, of a detachable cutting blade secured therein, said blade having double cutting edges on either end thereof, beveled from reverse sides of said blade, whereby the said cutting edges rest flat against the top of the wick tubes, when either end of said hub is inserted within a round wick tube, substantially as specified.

2. A round lamp wick trimmer, comprising a hub adapted to be inserted in a round wick tube, a detachable cutting blade secured in said hub, said blade having double eccentrically formed cutting edges on either end thereof, beveled from reverse sides of said blade, whereby the said cutting edges have a shearing movement, and rest flat against the top of the wick tubes, when either end of said hub is inserted in a round wick tube, substantially as set forth.

3. A round lamp wick trimmer, comprising a hub adapted to be inserted in a round wick tube, having one of its ends of a greater diameter than the other, a detachable cutting blade secured therein, said blade having double cutting edges on either end thereof, beveled from reverse sides of said blade, whereby the said cutting edges rest flat against the top of the wick tubes, when either end of said hub is inserted within a round wick tube, substantially as shown and described.

4. In a round lamp wick trimmer, the combination with a divided hub adapted to be inserted in a round wick tube, of a detachable cutting blade having the said divided hub secured on either side thereof, and double cutting edges on either end of said blade, beveled from reverse sides of said blade whereby the said cutting edges rest flat against the top of the wick tubes, when either end of said hub is inserted in a round wick tube, substantially as specified.

GILBERT J. DICKSON.

Witnesses:
FRED. A. WEISS,
BESSIE DOOLEY.

Copies of this patent may be obtained for five cents each, by addressing the "Commissioner of Patents, Washington, D. C."